United States Patent [19]
Hirono et al.

[11] 3,870,501
[45] Mar. 11, 1975

[54] BENZOXAZOLES AS DESUCKERING AGENTS

[75] Inventors: Yoshihiko Hirono, Hiratsuka; Hatsuo Ogino; Seiichi Nishikawa, both of Oiso-machi; Koshin Miyazaki; Masatoshi Yakushiji, both of Odawara; Tomio Yagihara, Oiso-machi, all of Japan

[73] Assignee: Nippon Soda Company Limited, Tokyo, Japan

[22] Filed: Oct. 9, 1973

[21] Appl. No.: 404,265

[30] Foreign Application Priority Data
Oct. 11, 1972 Japan.............................. 47-101147

[52] U.S. Cl...................... 71/78, 41/88, 260/307 A
[51] Int. Cl............................................... A01n 9/22
[58] Field of Search..................... 71/88, 78

[56] References Cited
UNITED STATES PATENTS
3,253,904  5/1966  Harrison ................................. 71/78
3,529,952  9/1970  Ellis ....................................... 71/78
3,546,231  12/1970  King et al. ............................. 71/88

FOREIGN PATENTS OR APPLICATIONS
1,197,677  7/1965  Germany ............................... 71/88
659,974  6/1965  Belgium ................................. 71/88

*Primary Examiner*—Glennon H. Hollrah
*Attorney, Agent, or Firm*—George B. Oujevolk

[57] ABSTRACT

A method in the management of the growth of tobacco plants comprising applying to the tobacco plants before decapitation a desuckering amount of a compound of the formula:

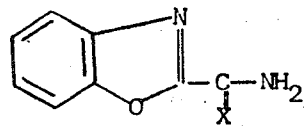

wherein X is oxygen or sulfur.

1 Claim, No Drawings

BENZOXAZOLES AS DESUCKERING AGENTS

The present invention relates to a method and composition for influencing and regulating the growth of plants by employing a benzoxazole compound corresponding to the formula

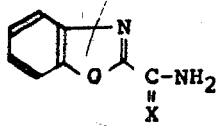

wherein X is the oxygen atom or sulfur atom.

The inventors synthesized many benzoxazoles and tested the biological activities thereof. As the result of the tests, it has been discovered that the compounds of the present invention are particularly effective as plant growth regulators.

Namely, these compounds participate in cell division, organ differentiation and pigment formation of plant, have useful function such as inhibiting effect or accelerating effect of plant growth in various stages of it, and furthermore the effect of organ formation.

Particularly, the compounds of this invention have superior activity for the inhibitory effect on the growth of axillary buds of tobacco plants.

Decapitation of tobacco plants is usually carried out in order to provide accumulated nourishment to its leaves after flowering and soon after that, the growth of axillary buds start, which causes undesirable effects to the suitable maturing of tobacco leaves.

By spraying the compounds on the leaves, they are absorbed in plant, move to the apical point of axillary buds of tobacco plants and inhibit the growth axillary buds.

These compounds give no effect both to the leaves whose growth was stopped and to the growth of tobacco leaves at the time of decapitation.

Maleic hydrazide have been used for the inhibition of axillary buds of tobacco plants. Though maleic hydrazide shows superior inhibition effect of axillary buds right after decapitation of tobacco plants, but the said effect is insufficient when it is sprayed several days after decapitation, that is to say, when axillary buds grow up to a certain stage. However, the compounds of the present invention are certainly able to inhibit the growth of axillary buds even if the said compounds are applied to plants right after decapitation or after growing up of axillary buds.

Furthermore, plant growth regulators of the present invention are concerned in the pigment formation and are able to control the coloring time of fruit and the pigment formation of flowers in horticulture.

It is another advantage of the invention that these compounds have low phytotoxicity and fish-toxicity.

The following example are presented by way of illustration of the preparation of the compounds of the present invention and are not intended to limit the scope of this invention.

EXAMPLE 1.

Preparation of benzoxazole-2-carboxamide

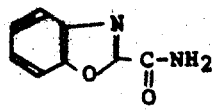

Dry hydrogen chloride at 20°C was passed through the 20 ml of the suspension solution of ethyl alcohol containing 2.9 g of 2-cyanobenzoxazole.

Crystals precipitated out as soon as the reaction mixture changed into a uniformly brown solution. After most of the ethyl alcohol was evaporated, 20 ml of 50 % ethyl alcohol was added to the said mixture in order to dissolve the above precipitates and ammonia water was added to this solution until the pH was over 7, then this solution was heated for 30 minutes at 60°C. The separated crystals were filtered and recrystallized from benzene, and 2.3 g scale crystals of benzoxazole-2-carboxamide was obtained. Yield; 71 %, m.p. 171°–173°C. Elemental analysis — Calcd. for $C_8H_6N_2O_2$ (%) : C, 59.25; H, 3.70; N, 17.90. Found (%) : C, 58.99; H, 3.63; N, 17.56.

EXAMPLE 2.

Preparation of benzoxazole-2-carbothioamide

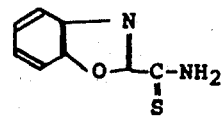

0.1 g of 2-cyanobenzoxazole was dissolved in 3 ml of ethyl alcohol to which a small amount of triethylamine was added and hydrogen sulfide was passed through this mixture at 20°C. Right after that, yellow crystals were separated. The crystals were filtered and recrystallized from ethyl alcohol, and 0.1 g of yellow crystals of benzoxazole-2-carbothioamide was obtained. Yield; 77 %, m.p. 160°–162°C. Elemental analysis — Calcd. for $C_8H_6N_2OS$ (%) : C, 53.93; H, 3.37; N, 15.73; S, 17.97. Found (%): C, 53.51; H, 3.40; N, 16.01; S, 18.12.

These compounds were not new, but they have not been tested for plant growth regulating effects so far as the inventors of the present invention know.

The active ingredient of this invention may be formulated by mixing with suitable carriers in a form generally used in agricultural chemicals such as wettable powder, emulsifiable concentrate, dust formulation, granular formulation, water soluble powder and aerosol. As solid carriers, bentonite, diatomaceous earth, apatite, gypsum, talc, pyrophyllite, vermiculite, clay and others are used. As liquid carriers, kerosene, mineral oil, petroleum, solvent naphtha, benzene, xylene, cyclohexane, cyclohexanone, dimethylformamide, alcohol, acetone, and others are used. Sometimes surface active agent is added in order to give a homogeneous and stable formulation.

A wettable powder or an emulsifiable concentrate obtained with above process is diluted to a specified concentration and it is used for spraying treatment of stems and leaves as a suspension solution or an emulsifiable solution and further a dust formulation or aerosol is directly used for the spraying treatment of stems and leaves.

The compounds of this invention also can be applied admixed with other chemicals which are used in agronomic and horticultural management and are compatible with the compounds of this invention. Such chemicals can be, but are not restricted to, the classes of chemicals commonly known as plant nutrients, fertilizers, insecticides, fungicides, herbicides and nematocides.

The concentrations of the active ingredients in the plant growth regulating compositions of this invention vary according to type of formulation, and they are, for example, used in a range of 5 – 80 weight percent, preferably 20 – 80 weight percent, in wettable powders, 5 – 70 weight percent, preferably 10 – 50 weight percent, in emulsifiable concentrates, and 0.5 – 20 weight percent, preferably 1 – 10 weight percent in dust formulation.

The non-limiting examples for the plant growth regulating compositions are illustrated as follows:

EXAMPLE 3.
Emulsifiable Concentrate

| | Parts by weight |
|---|---|
| Benzoxazole-2-carboxamide | 30 |
| Xylene | 42 |
| Dimethylformamide | 20 |
| Polyoxyethylene phenylether | 8 |

These are mixed and dissolved.

Consequently, emulsifiable concentrate containing 30 % of the active ingredient was obtained. In practical use, the solution was diluted with water in a concentration of 0.01 to 10 %, preferably 0.01 to 1.0 %, of active ingredient and then is sprayed as an emulsion.

EXAMPLE 4.
Wettable Powder

| | Parts by weight |
|---|---|
| Benzoxazole-2-carboxamide | 20 |
| Diatomaceous earth | 70 |
| Higher alcohol sulfonate ester | 5 |
| White carbon | 5 |

These were mixed homogeneously and reduced to fine particles. Consequently, wettable powder containing 20 % of active ingredient is obtained. In practical use, the mixture of fine particles was diluted in a concentration of 0.01 to 10 %, preferably 0.01 to 1.0 %, of active ingredient with water and is sprayed as a suspension.

EXAMPLE 5.
Dust Formulation

| | Parts by weight |
|---|---|
| Benzoxazole-2-carbothioamide | 5 |
| Talc | 95 |

These were mixed and crushed to a fine powder.

In practical use it is directly applied as dusting powder at a rate of 0.1 – 10 kg/a, preferably 1 – 2 kg/a.

The superior plant growth regulating effects of the present invention are clearly illustrated by the following tests.

Test 1. Inhibitory effect on the growth of axillary buds

Tobacco plants (variety: Yellow-Bright) were grown in pots (diameter: 30 cm) in a greenhouse. A few days after the first flowering, apical parts of the stem were cut off at 10 cm below the tips and immediately 10 ml of each chemical solution with concentration of 2,000 or 4,000 ppm was sprayed on each of the plants. Ten plants were used for each treatment. Ten and 30 days after the treatment the growth of axillary buds was examined. The results are shown in Table 1 where grades of the growth are expressed by 4 (the same as the control) to 0 (complete inhibition).

Phytotoxicity to tobacco leaves was not found in all treatments.

Table 1

| Test Compound | Concentration of active compound (ppm) | Rate of the growth of axillary buds | |
|---|---|---|---|
| | | 10 days | 20 days |
| benzoxazole-2-carboxamide | 4000 | 0 | 0.5 |
| | 2000 | 0.5 | 1.0 |
| benzoxazole-2-carbothioamide | 4000 | 0 | 0.5 |
| | 2000 | 0 | 1.0 |
| Untreated | – | 4 | 4 |

Test 2. Inhibitory effect in the growth of axillary buds

The apical part of the stem of tobacco plants grown in pots (30 cm diameter) in a greenhouse was cut off at 10 cm below the tips (when the plants were 1 m high).

One week after that, 10 ml of each concentration of chemical solutions was splayed on each of the plants. Then replications were made for each treatment.

Two and three weeks after the treatment, the growth of axillary buds was examined. The results are shown in Table 2 where grades of the growth are expressed by the same meanings as Table 1.

Phytotoxicity to tobacco leaves was not found in all treatments.

Table 2

| Test Compound | Concentration of active ingredient (ppm) | Rate of the growth of axillary buds | |
|---|---|---|---|
| | | 2 wks. | 3 wks. |
| benzoxazole-2-carboxamide | 2000 | 1.0 | 1.5 |
| | 1000 | 1.5 | 2 |
| maleic hydrazide | 2000 | 2 | 2 |
| | 1000 | 2 | 2.5 |
| Untreated | – | 4 | 4 |

Test 3. Promotive effect on fruits ripening

Tomato plants (variety: Fukuju) were grown in a plastic house in early spring.

Forty days after flowering 20 ml of each chemical solution with concentrations of 100 and 1000 ppm was sprayed on each of the plants.

Tomato fruits were harvested when they became a certain ripening stage. Only three earliest fruits were harvested from each plant. Five plants were used for each treatment.

The cumulation numbers of harvested fruits were recorded and shown in Table 3.

Phytotoxicity to leaves and fruit was not found in all treatments.

Table 3

| Test Compound | Concentration of active ingredient (ppm) | Cumulative numbers of harvested fruit | | |
|---|---|---|---|---|
| | | May 10 | May 20 | May 30 |
| benzoxazole-2-carboxamide | 1000 | 4 | 15 | 15 |
| | 100 | 1 | 9 | 15 |
| Untreated | — | 0 | 6 | 15 |

Test 4. Inhibitory effect on pigment formation

Hyacinth plants (red-violet flower colour) grown in fields were sprayed with each chemical solution (5,000 ppm concentration) before the bolting stage.

The effect of chemicals on the flower colour was examined. The results are shown in Table 4.

Phytotoxicity to leaves and stems was not found in all treatments.

Table 4

| Test Compound | Concentration of active ingredient (ppm) | Effect for the flower color |
|---|---|---|
| benzoxazole-2-carboxamide | 5000 | decolored |
| benzoxazole-2-carbothioamide | 5000 | decolored |
| Untreated | — | red-violet |

What is claimed is:

1. A method for controlling the growth of tobacco suckers comprising the step of applying to the plant a desuckering amount of a compound of the formula:

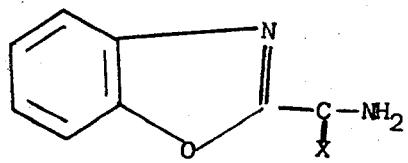

wherein

X is oxygen or sulfur, thereby inhibiting the growth of axillary buds.

* * * * *